No. 868,903. PATENTED OCT. 22, 1907.
H. ALRICH.
BOOK OR MUSIC LEAF TURNER.
APPLICATION FILED AUG. 3, 1906.
4 SHEETS—SHEET 4.
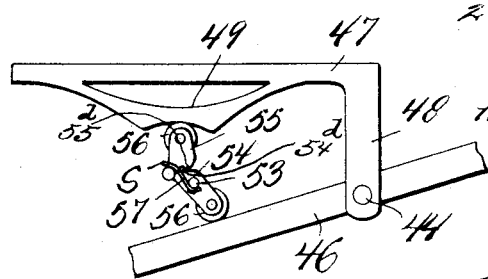
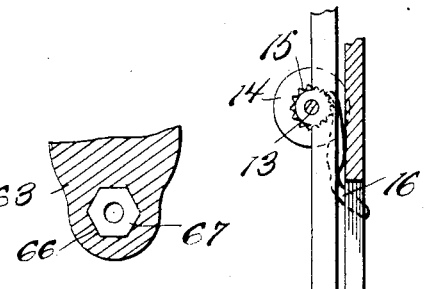
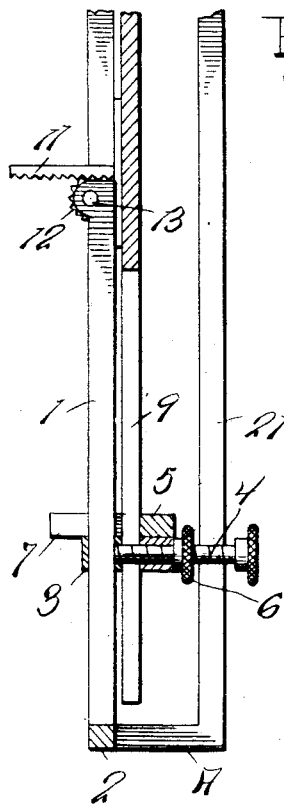
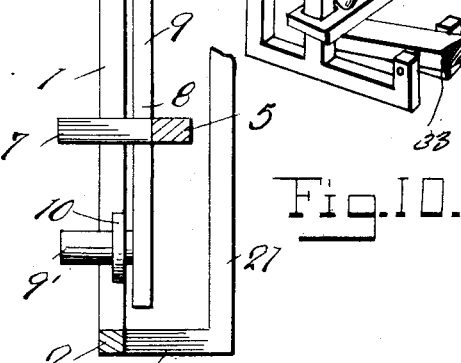
Witnesses
G. R. Thomas
M. O. Bowling
Inventor
H. Alrich
By
Swift & C.
Attorneys

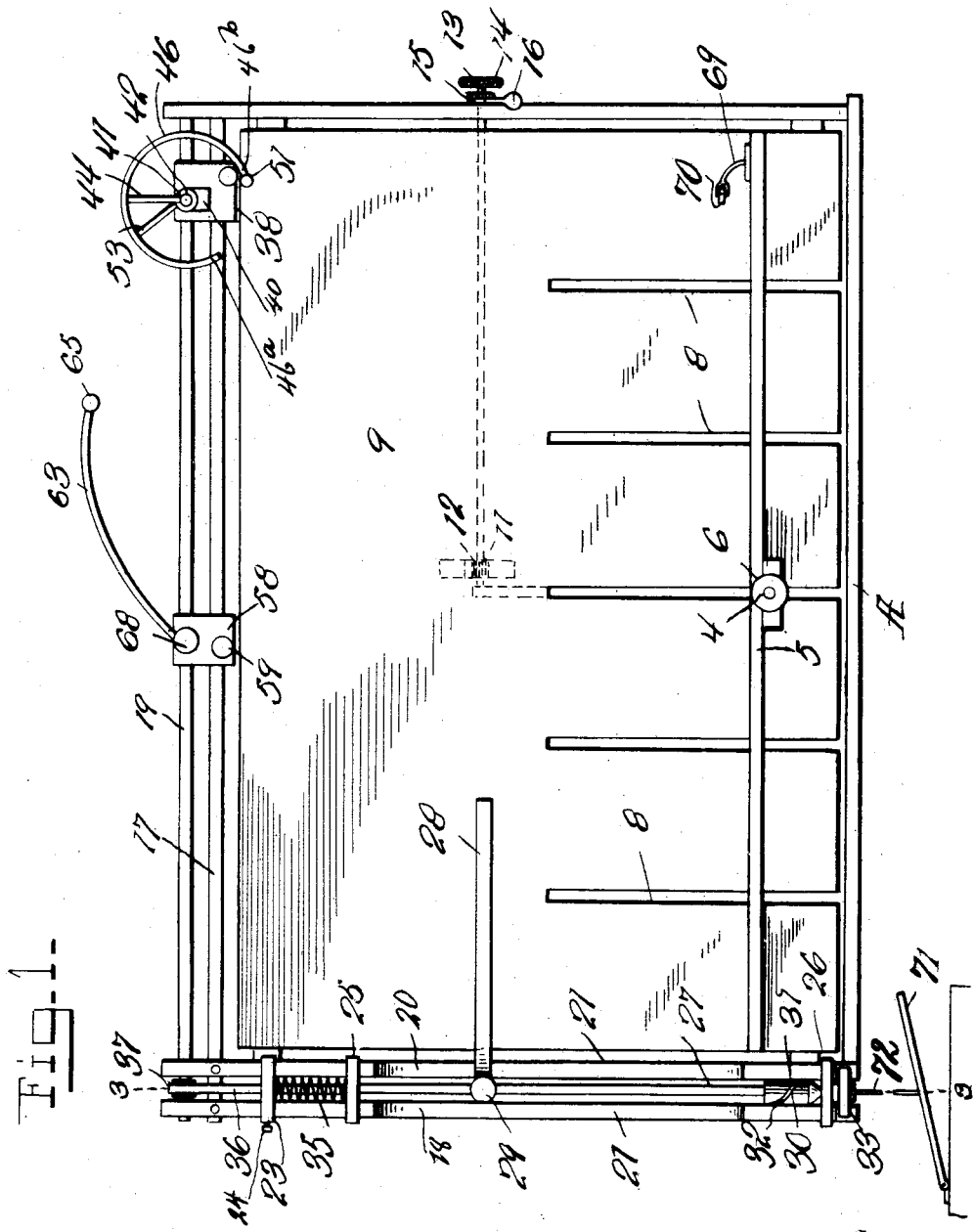

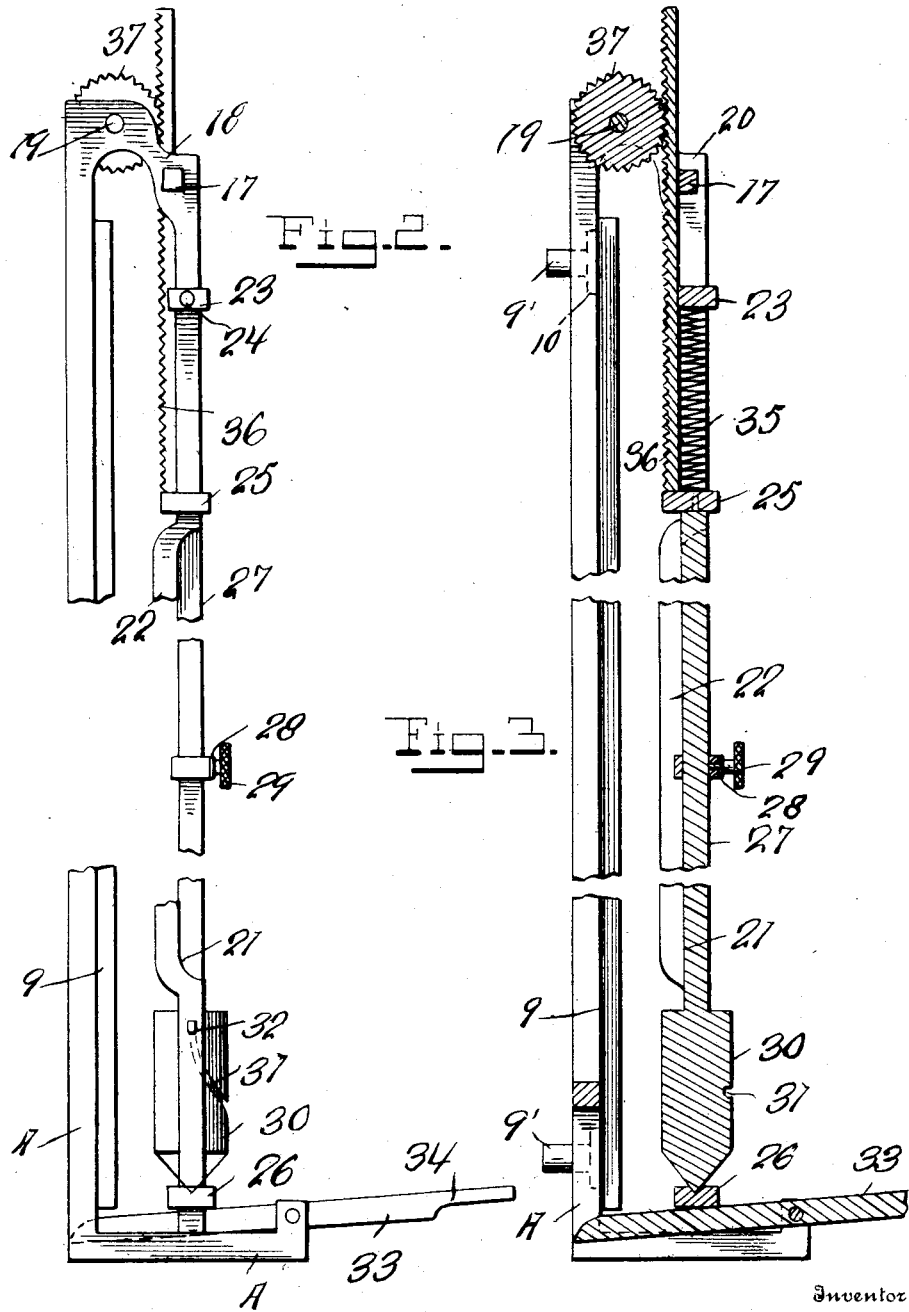

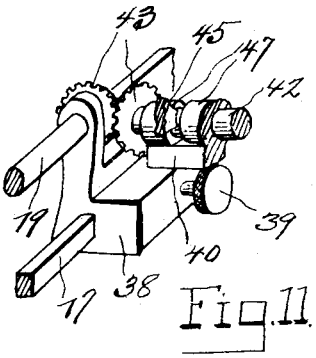
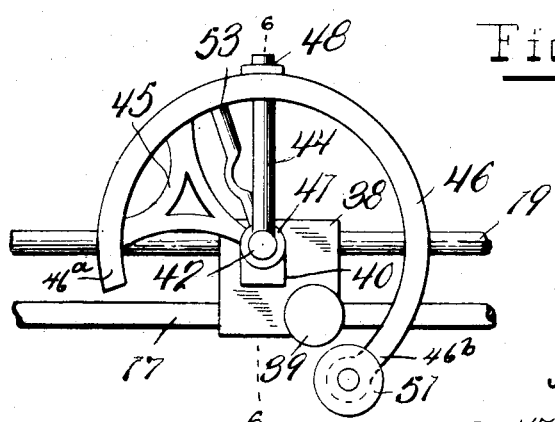
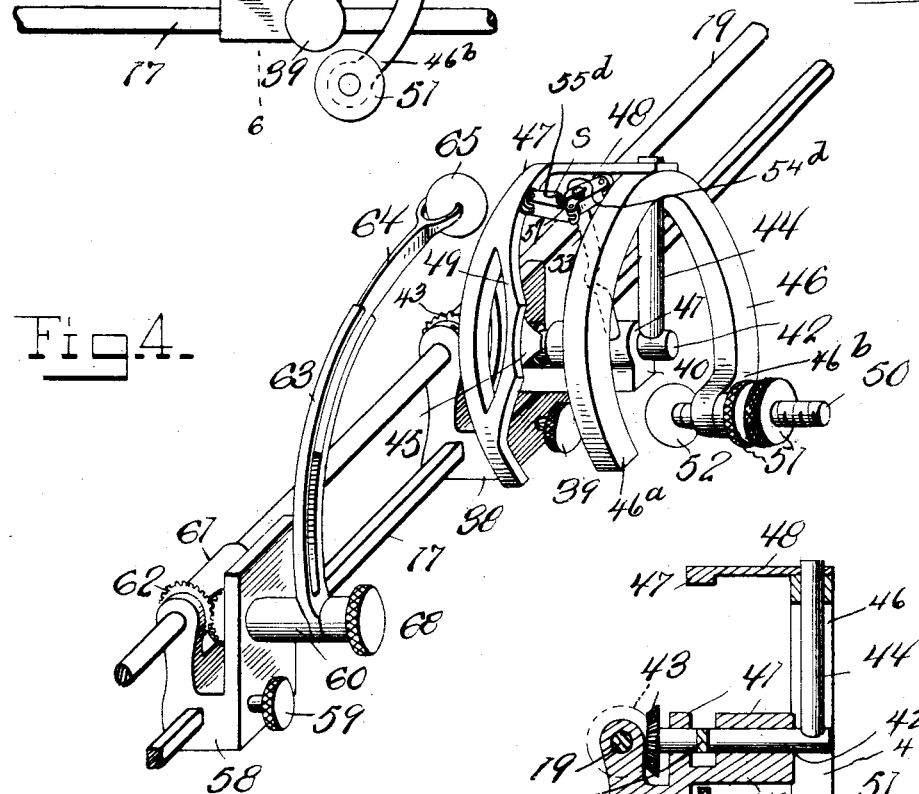
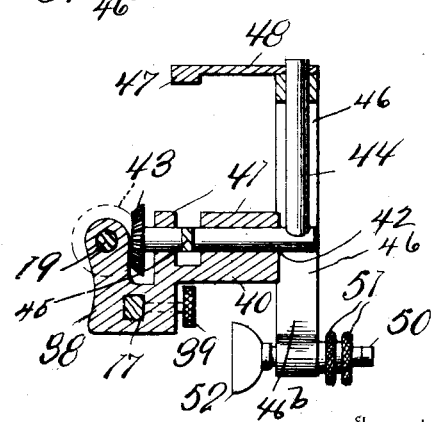

UNITED STATES PATENT OFFICE.

HENRY ALRICH, OF EL PASO, TEXAS, ASSIGNOR OF ONE-HALF TO JOHN STOCKMEYER, OF EL PASO COUNTY, TEXAS.

BOOK OR MUSIC LEAF TURNER.

No. 868,903.  Specification of Letters Patent.  Patented Oct. 22, 1907.

Application filed August 3, 1906. Serial No. 329,078.

*To all whom it may concern:*

Be it known that I, HENRY ALRICH, a citizen of the United States, residing at El Paso, in the county of El Paso and State of Texas, have invented a new and useful Book or Music Leaf Turner; and I do hereby declare the following to be a full, clear, and exact description of the invention, such as will enable others skilled in the art to which it appertains to make and use the same.
The invention relates to a book or music leaf turner, and has for its object to provide, a simple, efficient and durable device of this class, and one which may be readily attached to pianos and other musical instruments.
In the accompanying drawings has been illustrated a simple and preferred form of the invention; it being however, understood that no limitation is necessarily made to the precise structural details therein exhibited, but that changes, alterations and modifications within the scope of the invention may be resorted to, when desired.

In the drawings:—Figure 1 is a front elevation of a music leaf turner, constructed in accordance with this invention. Fig. 2 is a side elevation. Fig. 3 is a transverse sectional view, on line 3—3 of Fig. 1. Fig. 4 is a perspective view, of the sheet-turning mechanism showing the parts thereof in their initial positions. Fig. 5 is a front view of a portion of Fig. 4. Fig. 6 is a transverse sectional view on line 6—6 of Fig. 5. Fig. 7 is a plan view of the same showing the parts 54 and 55 closed. Fig. 8 is a detail view of the sheet-turning arm. Fig. 9 is a section through the music support. Fig. 10 is a sectional view similar to Fig. 9. Fig. 11 is a detail view clearly illustrating the coöperation between the gears 43. Fig. 12 is a detail view clearly illustrating the elements 21 to 27.

The frame, A, of the improved device is substantially of rectangular shape, and said frame may be constructed in any suitable and convenient manner of wood, metal, or any other appropriate material or combination of materials. Said frame includes an upright or bracket member, 1, extending from the bottom bar 2 thereof, and upon said upright is adjustably mounted a sleeve, 3, secured by means of a clamping screw, 4, and carrying a ledge or book-rest, 5, which may be secured upon the screw as by means of clamping nuts, 6. The ledge or book-rest is provided with guide-arms, 7, extending through slots, 8, in the back-board or desk, 9, thus permitting the book-rest to be vertically adjusted, to accommodate various sizes of books or music sheets.

The back-board is provided near the corners thereof with rearward extending guide pins or dowels, 9', which are guided through apertured brackets, 10, connected with the frame, thus permitting the back-board or desk to be moved forward and rearward to accommodate books of various thickness. Said back-board is also provided near the center thereof with a rearward extending rack, 11, engaged by a pinion, 12, upon a shaft, 13, the inner end of which is supported in the bracket 1 while the outer end of said shaft is journaled at the right hand end of the frame. The shaft 13 has a button, 14, whereby it may be conveniently turned; and it has a ratchet wheel, 15, engaged by a pawl, 16, pivoted upon the frame, whereby said shaft and the back-board or desk controlled thereby will be securely retained in position at various adjustments.

The top bar, 17, of the frame, which is of non-circular cross section, is supported by brackets, 18, extending forwardly from the end members of the frame; and the latter supports, in rear of said top bar, a shaft, 19, which is also, preferably, of non-circular cross section through the greater portion of its length; said shaft being, however, supported for rotation as will be readily seen.

Brackets, 18 and 20, at the left hand end of the frame support a pair of vertical guide bars, 21, having rearwardly offset portions, 22. These guide bars are connected near their upper ends by a stationary cross piece, 23, secured in position, adjustably, by means of screws, as 24. The guide bars 21 also support a pair of slidable cross pieces, 25, 26, affording bearings for a vertical shaft, 27. (It will be understood that while the term "vertical" is resorted to for convenience of description, the device, when in actual use, occupies an inclined position, so that the actual operative position occupied by said shaft will be inclined to any desired degree.) The shaft 27 carries a, preferably resilient, leaf holding arm, 28, which is secured in position thereon, adjustably, by means of a set-screw, 29, in order that it may be conveniently adjusted to books of various sizes, and in such a manner as to lie between the printed lines, so as not to obstruct the view; said arm may also advantageously be made of transparent material, if so desired.

The shaft 27 carries a cylindrical member, 30, which has been illustrated as having a conical lower extremity, constituting one of the bearings of the shaft. The cylinder 30 has a cam-groove, 31, engaged by a tooth or spur, 32, extending from one of the guide bars 21 whereby, when the shaft is moved in an upward direction by sliding the cross pieces in which it is journaled upward upon the guide bars 21, the said shaft will be rotated to the extent of about one-fourth of a revolution, thus releasing the leaf holding arm from contact with the leaves of the book supported upon the desk. The rearwardly offset portions of the bars 21 prevent the latter from interfering with the operation of the leaf holding arm.

The cross-pieces or slides carrying the shaft 27 may be moved in an upward direction by means of a lever, 33, pivoted upon the brackets 20, and having a finger piece, 34, at its front end, the rear end of said lever being extended beneath the lower cross-piece, 26. When pressure upon the lever ceases, the parts are restored to normal position by means of a spring, 35, interposed between the upper slidable cross-piece 26 and the cross-piece 23; the tension of said spring being regulable by adjustment of the cross-piece 23.

Connected with the upper slidable cross-piece 25, and guided through the stationary cross-piece 23 is a rack bar, 36, engaging a pinion, 37, upon the shaft 19, which latter will thus be rotated, to any desired extent, which is governed by the size of the pinion and the extent of the movement of the rack bar.

The top bar 17 of the frame carries, near its right hand end, a bracket, 38, secured adjustably thereupon as by means of a set screw, 39, and said bracket has a forwardly extending arm, 40, provided with boxes or bearings, 41, for a shaft, 42, having its rear end connected with the shaft 19 by means of bevel gears, 43, whereby it receives rotary, or oscillatory, motion when the shaft 19 is operated. The shaft 42 is provided, near its front and rear ends, respectively, with arms or spokes, 44 and 45, upon the former of which is pivoted a segmental arm, 46. The spoke 45 carries a rigid segmental arm, 47, of less extent than the arm 46, the arm 47 being connected with the extremity of the spoke 44 by a brace bar, 48, whereby the parts are strengthened and reinforced. The arm 47 is provided with a cam-shaped track, 49, extending from the bar 48 in the direction of the inner end of the pivoted arm 46; and the outer end of said pivoted arm,—whereby is meant the end or extremity nearest the edge of the frame A—, carries a screw, 50, provided with clamp nut, 51, whereby it may be secured in position at various adjustments, and having at its rear end a cup-shaped or otherwise suitably constructed leaf engaging member, 52, which is preferably constructed of india rubber, or a composition containing rubber, to the end that it will frictionally engage the surface of a leaf that is to be turned, so as to start such leaf, and cause it to bulge outward at its upper edge to a position where it may be engaged conveniently, efficiently and with certainty by the turning arm or member which will be presently described.

One of the bearing members or boxes 41 carries a radial arm, 53, extending between the arms 46 and 47, and carrying a member which I will designate the "spreader," S, and which comprises two hingedly connected arms or parts, 54 and 55, provided at their terminal ends with small wheels or anti-friction members, 56, engaging the tracks formed by the opposing sides or faces of the arms 46 and 47, including the cam-shaped track 49. The member 54 is pivoted upon the arm 53, and it extends in the direction of the pivoted arm 46 carrying the leaf starting member; the member 55 which is hingedly connected with the member 54, extends in the direction of the arm 47 having the cam 49, so as to be engaged by the latter when the shaft 42 is rotated the parts 54 and 55 are provided with abutting surfaces $54^d$ and $55^d$; a spring, 57, serves to hold the parts 54 and 55 normally in open relation, which spring is secured by a rivet to the member 53.
It will be seen, that when the shaft 42 is partly rotated from right to left, by the mechanism provided for the purpose, the arms 46 and 47 will move through the arc of a circle and the cam portion or track encountering the part 55 of the spreader will turn the latter partly upon its fulcrum, causing the roller at the extremity of the part 54 to engage and press against the inner end $46^a$ of the pivoted arm 46, thus causing the outer end $46^b$ of said arm, carrying the leaf starting member, to be forced, or swung, in a rearward direction, so that said leaf starting member will press and push against the subjacent leaf of a music book or other volume supported upon the desk, with an action closely resembling that of a human finger, and with the obvious result of bulging the upper edge of the top-most leaf in an outward direction. When the parts start to move in a reverse direction, towards the initial or normal position, the parts of the spreader will buckle together against the tension of the spring 57, thus preventing the spreader from obstructing the return movement of the arms 46 and 47, and permitting the arm 46 so to swing as to release the leaf starting member from operative engagement with the leaf.

The top bar 17 of the frame carries an additional bracket, 58, secured adjustably thereupon by means of a set-screw, 59. The brackets 58 and 38, it will be noted, afford auxiliary bearings for the shaft 19, which extends there through. The bracket 58 has a bearing for a shaft, 60, carrying at its rear end a bevel pinion, 61, meshing with a bevel pinion, 62, upon the shaft 19, from which latter motion of any desired extent, may be imparted to the shaft 60, the extent of the motion being governed by the relative sizes of the pinions. The shaft 60 carries near its front end a curved leaf turning arm, 63, preferably provided with an extension slide, 64, carrying at its outer extremity a spherical or other suitably shaped leaf engaging member, 65, of wood, glass, ivory, or other suitable material, smoothly polished, so as to be capable of turning leaves without injury thereto, the member 65 being journaled for rotation at the outer extremity of the arm or extension member. The leaf turning arm is adapted to engage behind the bulging portion of the upper edge of a leaf started by the starting member, and complete the turning of such leaf, as will be readily understood.
The leaf turning arm is preferably provided with a hexagonal or other polygonal shaped eye, 66, engaging a correspondingly shaped boss, 67, at the forward end of the shaft 60, upon which it is secured by a set screw or clamping screw, 68, in such a manner that it may be extended at an angle from the shaft that shall place it in convenient position with relation to the book that is to be operated upon.

The book rest or supporting ledge 5 is preferably provided, near its right hand end, with a small spring actuated arm 69, having a terminal leaf engaging roller, 70, adapted to engage the lower right hand corners of the leaves lightly, to hold them properly in position, for operation.

From the foregoing description taken in connection with the drawings hereto annexed, the operation and advantages of this invention will be readily understood.

The device is adapted to be used in connection with music stands of any kind, with the desks or music racks of pianos or organs and similar instruments, or with supporting means of any kind, upon which it will be mounted for operation in any convenient manner; the exact manner of supporting the device being varied according to circumstances. In place of striking the operating lever 33 with a finger, said lever may, if desired, be suitably connected with and operated by a foot treadle, within the scope of the invention; such foot lever or treadle being conventionally indicated in the drawing, at 71, together with a link or connecting rod, 72. When the lever 33 is actuated, it elevates the shaft 27, which is partly rotated so as to raise the leaf holder 28 from the leaves at the left hand side of the book. At the same time, the rack 36 is elevated, engaging the pinion 37 so as to partially rotate the shaft 19, whereby the leaf starting and leaf turning members are actuated, as previously described. When the lever 33 is relieved from pressure, the parts are restored to normal position by the action of the spring 35.

The several parts of the improved device are capable of being expeditiously and effectively adjusted to various positions, to enable books of different bulk and of various dimensions to be operated upon. The general construction is simple, and not liable to get out of order, and the device is thoroughly reliable in operation, and enables the performer to turn the music leaves quickly, and with a minimum of effort.

Having thus described my invention, I claim and desire to secure by Letters Patent of the United States:—

1. In a device of the class described, a frame having guide bars, a cross piece adjustably secured upon said guide bars, cross pieces mounted to slide upon the latter, a rock-shaft supported in the sliding cross pieces and having a leaf holding arm, a lever supported to engage one of the sliding cross pieces, a spring interposed between the other sliding cross piece and the stationary cross piece, a rack connected with one of the sliding cross pieces and guided through the stationary cross piece, and a rock-shaft supported in the frame and having a pinion engaged by the rack, a leaf starting device adapted to be operated through the medium of the last named rock shaft.

2. In a device of the class described, a frame, members slidably connected therewith, a rock-shaft supported in the slidable members for longitudinal movement, a leaf holding arm upon the rock-shaft, a rock-shaft supported in the frame at an angle to the movable rock-shaft, means connected with the slidable rock-shaft supporting members for imparting oscillatory movement to the rock-shaft supported in the frame, and leaf-starting and leaf-turning members actuated by the latter last-named rock-shaft.

3. In a device of the class described, a pivoted member supported for oscillatory movement, a screw-threaded rod extending through one end of said member, clamping nuts upon said rod, and a frictional leaf engaging member carried by the latter.

4. In a device of the class described, a book support, a bracket adjustable thereon, a rock-shaft supported in bearings in said bracket and having spokes, an arm pivoted upon one of the spokes and having a leaf engaging member, an arm secured upon the other spoke and having a cam-track, and a spreader connected with the bearing of the rock-shaft and extending between the pivoted and stationary arms.

5. In a device of the class described, a book support, a bracket adjustable thereon, a rock-shaft supported in bearings in said bracket and having spokes, an arm pivoted upon one of the spokes and having a leaf engaging member, an arm secured upon the other spoke and having a cam-track, an arm extending from the bearing of the rock-shaft, and a spreader pivoted upon said arm and including two hingedly connected members and a spring normally holding said members in open relation.

6. In a device of the class described, a leaf starting device including a pair of arms supported for oscillation, one of said arms being pivoted and provided with a leaf engaging member and the other arm having a cam-track, and a pivoted spreader supported between the arms and adapted to be actuated by the cam-track of one arm to turn the other arm upon its pivot.

7. In a device of the class described, a frame, an adjustable bracket, a rock-shaft supported by the bracket, a leaf turning arm adjustably connected with the rock-shaft and having an extension slide, and a leaf engaging member connected with the latter for rotation.

8. A device of the class described, including a book support, a longitudinally movable rock-shaft having a leaf-holding arm, a longitudinally movable rack operatively connected with the rock-shaft, lever means for moving the rock-shaft and the rack in one direction, spring means for restoring the rock-shaft and the rack to initial position, a rock-shaft having a pinion engaging the rack, adjustably supported brackets affording auxiliary bearings for the latter rock-shaft, a leaf starting device supported by one of the brackets, a leaf turning arm supported by the other bracket, and means for actuating the leaf starting and turning devices by the oscillation of the rock-shafts.

9. In a leaf turning device, an oscillatory starting device, having a pair of arms, one of said arms being pivoted and provided with a leaf-engaging member, and the other arm having a cam, and a movable spreader disposed between the arms and adapted to be actuated by the cam to turn the other arm upon its pivot.

10. In a leaf turning device, a leaf starting device supported for oscillation and provided with a leaf engaging member and an actuating cam track, and a pivoted spreader disposed for coöperation with the leaf engaging member and the cam track.

11. In a leaf turning device, a pair of parallel shafts a bracket adjustable thereon, a rock shaft projecting at right angles thereto, a bearing therefor, a pair of radiating members movable with the shaft, one of the members having a cam, while the other is provided with a leaf-engaging member, a member radiating from the bearing of the shaft, and a spreader carried thereby.

12. In a leaf turning device, a leaf starting device supported for oscillation and provided with a leaf engaging member and an actuating cam track, and a pivoted spreader disposed for coöperation with the leaf engaging member and the cam track, and means for operating said leaf starting device.

13. In a device of the class described, a frame having guide bars, a cross piece adjustably secured upon said guide bars, cross pieces mounted to slide upon the said guide bars, a rock-shaft supported in the sliding cross pieces and having a leaf holding arm, a lever supported to engage one of the sliding cross pieces, a spring interposed between the other sliding cross piece and the adjustable cross piece, a rack connected with one of the sliding cross pieces and guided through the stationary cross piece, a rock-shaft supported on the frame and having a pinion engaged by the rack, a leaf starting device adapted to be operated through the medium of said rock shaft, said leaf starting device being supported for oscillation and provided with a leaf engaging member and an actuating cam track, and a pivoted spreader disposed for coöperation with the leaf engaging member and the cam track.

In testimony whereof I have signed my name to this specification in the presence of two subscribing witnesses.

HENRY ALRICH.

Witnesses:
   W. C. McGOWN,
   I. H. McKINNELL.